United States Patent [19]

McCann et al.

[11] Patent Number: 5,042,883

[45] Date of Patent: Aug. 27, 1991

[54] TRAILER BRAKING SYSTEM FOR A TOWING VEHICLE

[75] Inventors: Denis J. McCann, Powys, Wales; Malcolm Brearley; David C. Hurst, both of Solihull, England

[73] Assignee: Lucas Industries public limited company, Birmingham, England

[21] Appl. No.: 489,181

[22] Filed: Mar. 8, 1990

[30] Foreign Application Priority Data

Mar. 8, 1989 [GB] United Kingdom ............... 8905312
Mar. 18, 1989 [GB] United Kingdom ............... 8906272

[51] Int. Cl.⁵ .......................................... B60T 13/00
[52] U.S. Cl. ........................................ 303/7; 303/14; 303/15; 303/28; 303/29; 303/DIG. 3
[58] Field of Search ............ 303/7, 9, 13, 14, 15, 303/18, 28–30, 40, DIG. 3, 9.76; 188/3 R, 3 H, 112 R

[56] References Cited

U.S. PATENT DOCUMENTS

| | | | |
|---|---|---|---|
| 3,497,267 | 2/1970 | Dobrikin | 303/15 X |
| 3,507,542 | 4/1970 | Cannella | 303/7 |
| 3,667,815 | 6/1972 | Zoppi | 303/7 |
| 3,708,212 | 1/1973 | Cannella | 303/7 |
| 3,747,992 | 7/1973 | Schnipke | 303/29 X |
| 3,796,468 | 3/1974 | Morse et al. | 303/DIG. 3 X |
| 3,832,015 | 8/1974 | Beck et al. | 303/29 X |
| 4,049,324 | 9/1977 | Cermak | 303/DIG. 3 X |
| 4,258,959 | 3/1981 | Knight et al. | 303/7 |
| 4,307,916 | 12/1981 | Straut et al. | 303/9.76 |
| 4,410,218 | 10/1983 | Bueler | 303/28 X |
| 4,436,347 | 3/1984 | Stumpe | 303/15 X |
| 4,455,051 | 6/1984 | Falk | 303/28 X |
| 4,478,459 | 10/1984 | Cumming | 303/7 |
| 4,585,278 | 4/1986 | Grauel et al. | 303/15 X |
| 4,616,881 | 10/1986 | Müller et al. | 303/15 X |
| 4,632,466 | 12/1986 | Grauel et al. | 303/15 X |
| 4,712,839 | 12/1987 | Brearley et al. | 303/15 X |
| 4,770,470 | 9/1988 | Tarumizu et al. | 303/13 X |
| 4,775,192 | 10/1988 | Pohl et al. | 303/7 |
| 4,861,115 | 8/1989 | Petersen | 303/14 X |

Primary Examiner—Douglas C. Butler
Attorney, Agent, or Firm—Scrivener and Clarke

[57] ABSTRACT

A trailer braking system for a towing vehicle has a trailer braking valve (26) is fed with a pressurized air supply which is modulated by the opening of the valve, as controlled by a first control pressure regulated by a trailer braking controller (24) in accordance with braking demand signals, to produce a trailer braking pressure. In order that a trailer braking pressure may be generated even if the above trailer braking valve control fails, the valve is supplied with a second control pressure independently of the first, and which is also capable of operating the trailer braking valve (26). In a preferred embodiment, the second control pressure is supplied from a braking line of the towing vehicle, such that the "back up" control pressure is a function of the towing vehicle braking.

17 Claims, 14 Drawing Sheets

TRAILER BRAKING SYSTEM FOR A TOWING VEHICLE

The present invention relates to trailer braking systems for towing vehicles, and in particular to electronic braking systems (EBS) for towing vehicles.

When it is desired to use EBS with a trailer, it is preferable to mount the EBS control for the trailer brakes on the towing vehicle, since one towing vehicle is likely to tow several different types of trailers. The braking pressure is generated on the towing vehicle and is supplied from the pressure system of the vehicle as modulated by an electronic control. A failure in the electronic control thus risks total loss of trailer braking.

It is thus an object of the present invention to provide a trailer braking system for a towing vehicle which overcomes the aforementioned problems.

In accordance with a first aspect of the present invention, a trailer braking system for a towing vehicle comprises trailer braking control means arranged to receive electrical braking demand signals generated in response to a braking demand at the towing vehicle and being adapted to supply a first control signal which regulates the opening of a trailer braking valve in order to modulate a pressurised air supply to the trailer and thereby generate trailer braking, wherein the system is adapted to supply a backup control pressure to regulate the opening of the trailer braking valve and modulate the pressurised air supply when the regulation by the control signal is deficient.

This arrangement aims to ensure that a complete loss of trailer service brake pressure does not occur if the control means fails.

Preferably, the back up pressure is supplied from a brake circuit of the towing vehicle, and a selected towing vehicle axle circuit may be utilised by connecting the braking pressures in each brake circuit of an axle to a comparator valve which selects the higher of the pressures. Preferably, the selected pressures from each axle are compared at a further comparator valve, to produce the highest back up valve pressure.

Alternatively, the back up pressure may be generated from a second channel of electrically controlled braking pressure developed by a separate control channel in the trailer braking controller which uses a separate electro-pneumatic valve. The two trailer control pressures are preferably developed in two separate valve elements, each controlled by a specific trailer control channel incorporated into separate front and rear tractor axle braking controllers.

The back up pressure may be a preset proportion of the trailer reservoir pressure, which may be switched in by a valve in the event of development of a fault causing failure of the trailer electrical control pressure.

The system may be arranged such that any failure of trailer braking, as detected by control means, initiates trailer emergency braking. This may be achieved by isolating the trailer supply and dumping the trailer supply pipe to atmosphere or by isolating and dumping the inverse parking air supply from an electrical trailer control valve.

The present invention has the following additional advantages. When ABS (anti-skid braking system) operation occurs (if available) on the towing vehicle as it travels onto a surface having a lower level of friction, the pressure in the trailer service line is also reduced. This reduces the amount of trailer braking before it crosses onto the lower friction surface, thus making the possibility of trailer wheel-lock less likely.

Also, if the back up pressure is provided from the front or rear towing vehicle channels, the amount of trailer braking generated under a failed trailer controller situation is dependent upon the pressure in the said back up channel at the instant of failure. This would be undesirable if the trailer was laden and the towing vehicle unladen. To allevite this, the pressure in the said back up channel can be increased at the instant of failure, thus providing a higher back up pressure. The truck ABS (if available) would subsequently limit the eventual pressure reached in the trailer braking system.

In one embodiment the trailer braking valve comprises a valve inlet for the pressurised air supply, a valve outlet for the exhaust of the modulated air supply, a valve seat disposed between the inlet and the outlet, a valve closure member biassed towards engagement with the valve seat, a first piston slidably disposed within the valve housing and being displaceable by application of the first control pressure to a first pressure chamber, one end of which is defined by the first piston, a second piston slidably disposed within the valve housing between the first piston and the vave seat, a second pressure chamber defined between the first and second pistons and to which the second control pressure is applied, the second piston being engageable with the valve closure member whereby displacement of the second piston causes the valve closure member to be displaced from its valve seat.

Preferably, the trailer braking valve is used in the trailer braking system previously mentioned.

By way of example only, specific embodiments of the present invention will now be described, with reference to the accompanying drawings, in which.

Figure 1:
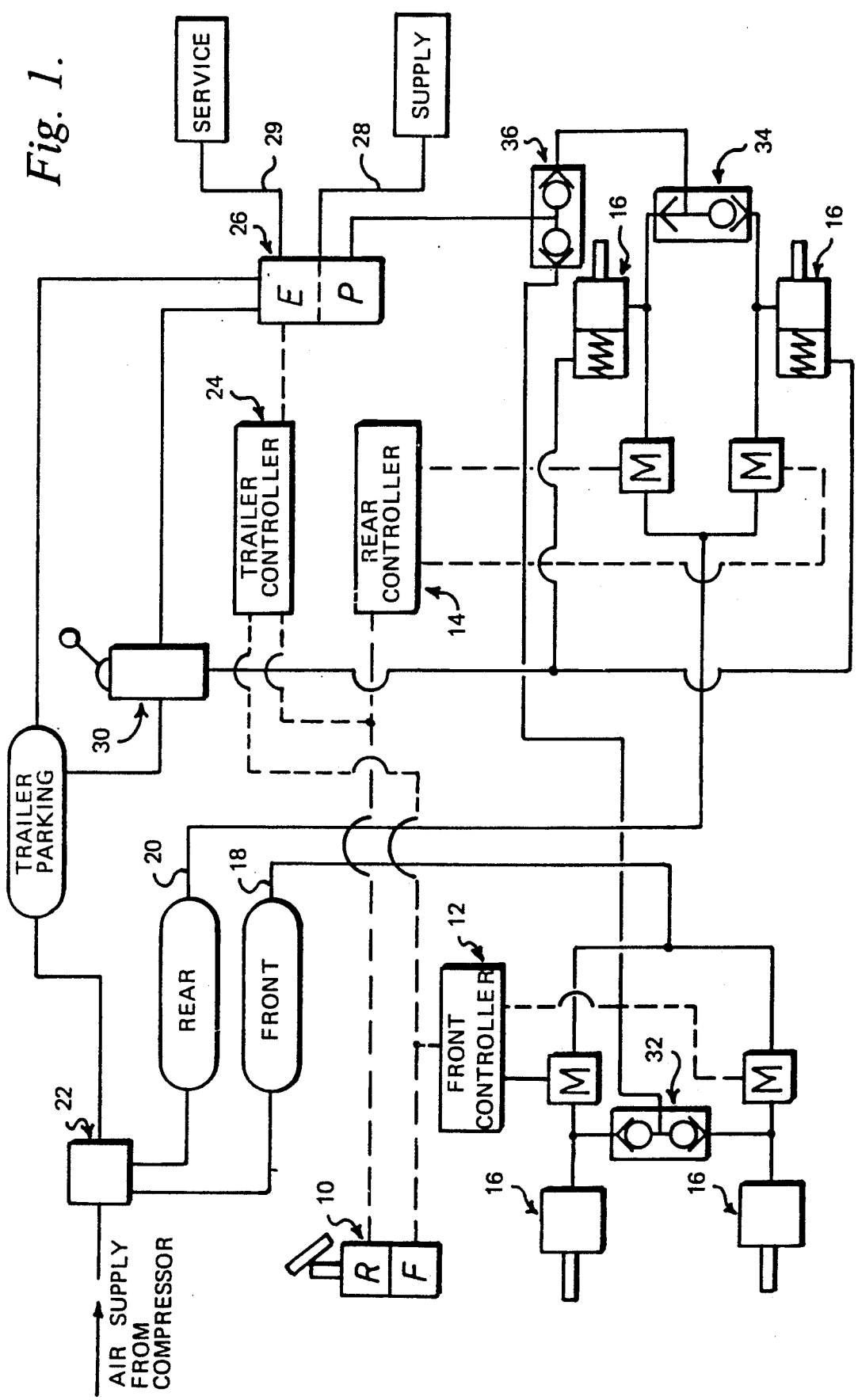
FIG. 1 is a schematic diagram of a braking circuit fitted with an embodiment of trailer brake valve in accordance with the present invention.
Figure 8:
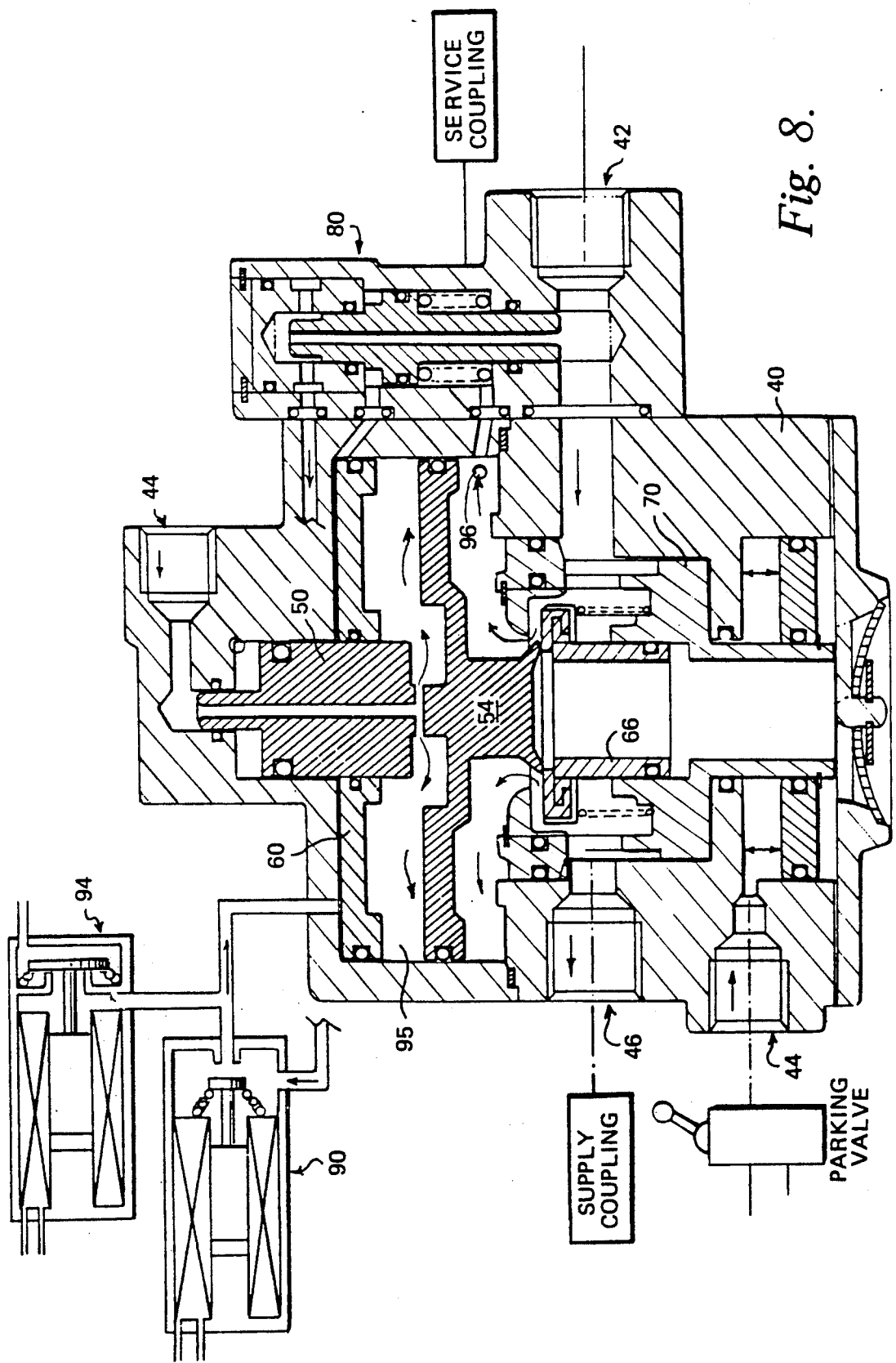
Figure 9:
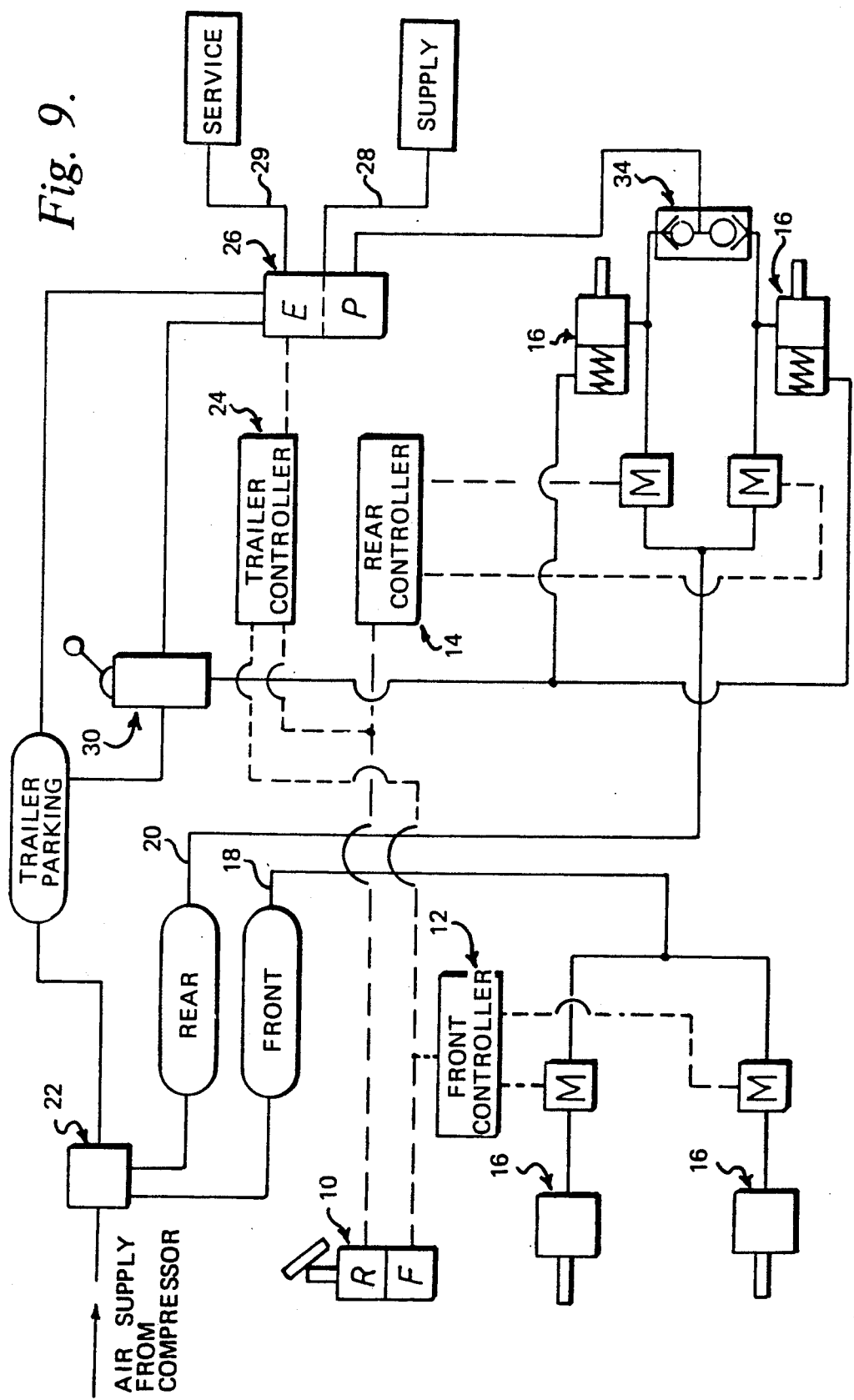
Figure 10:
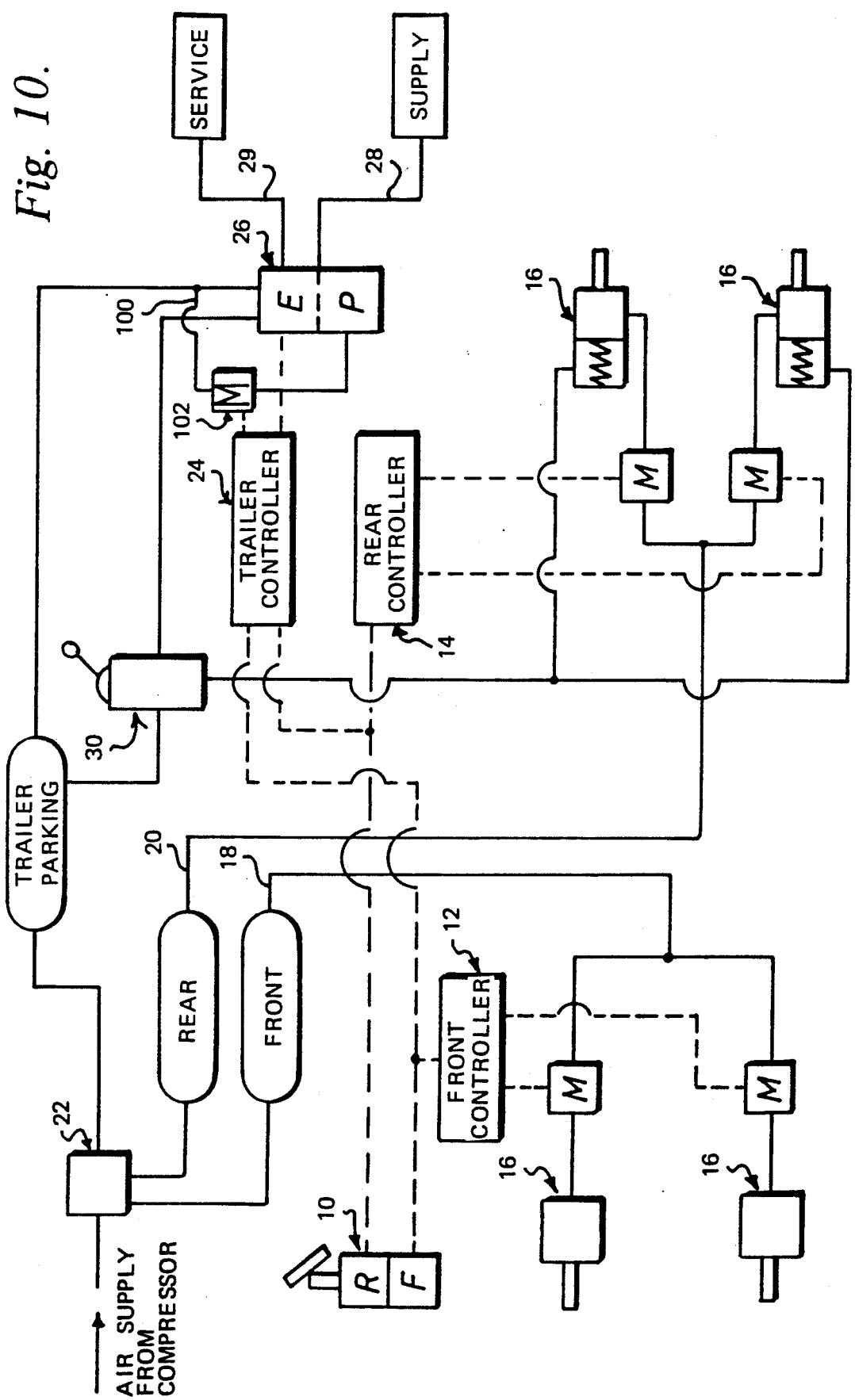
Figure 11:
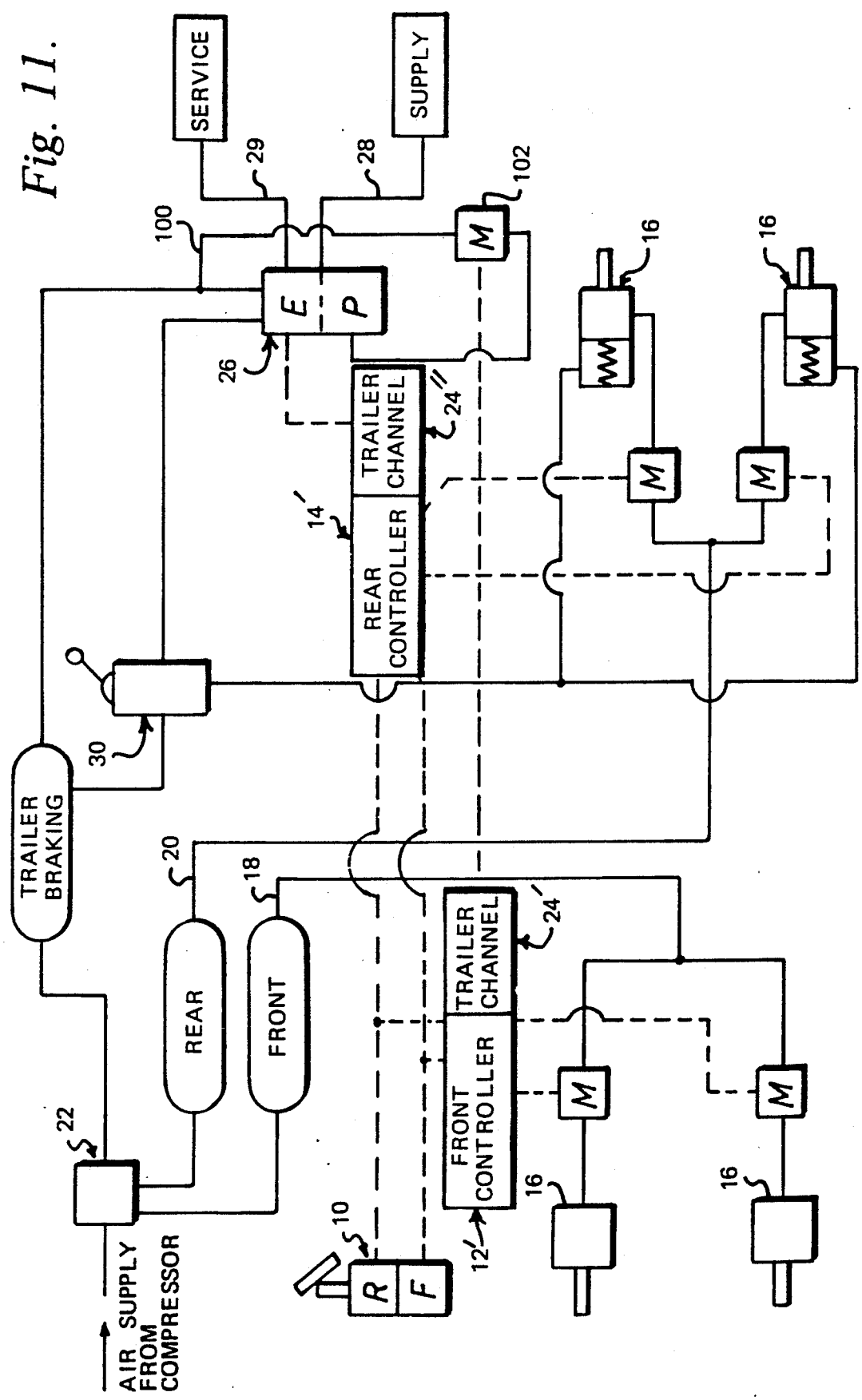
Figure 12:
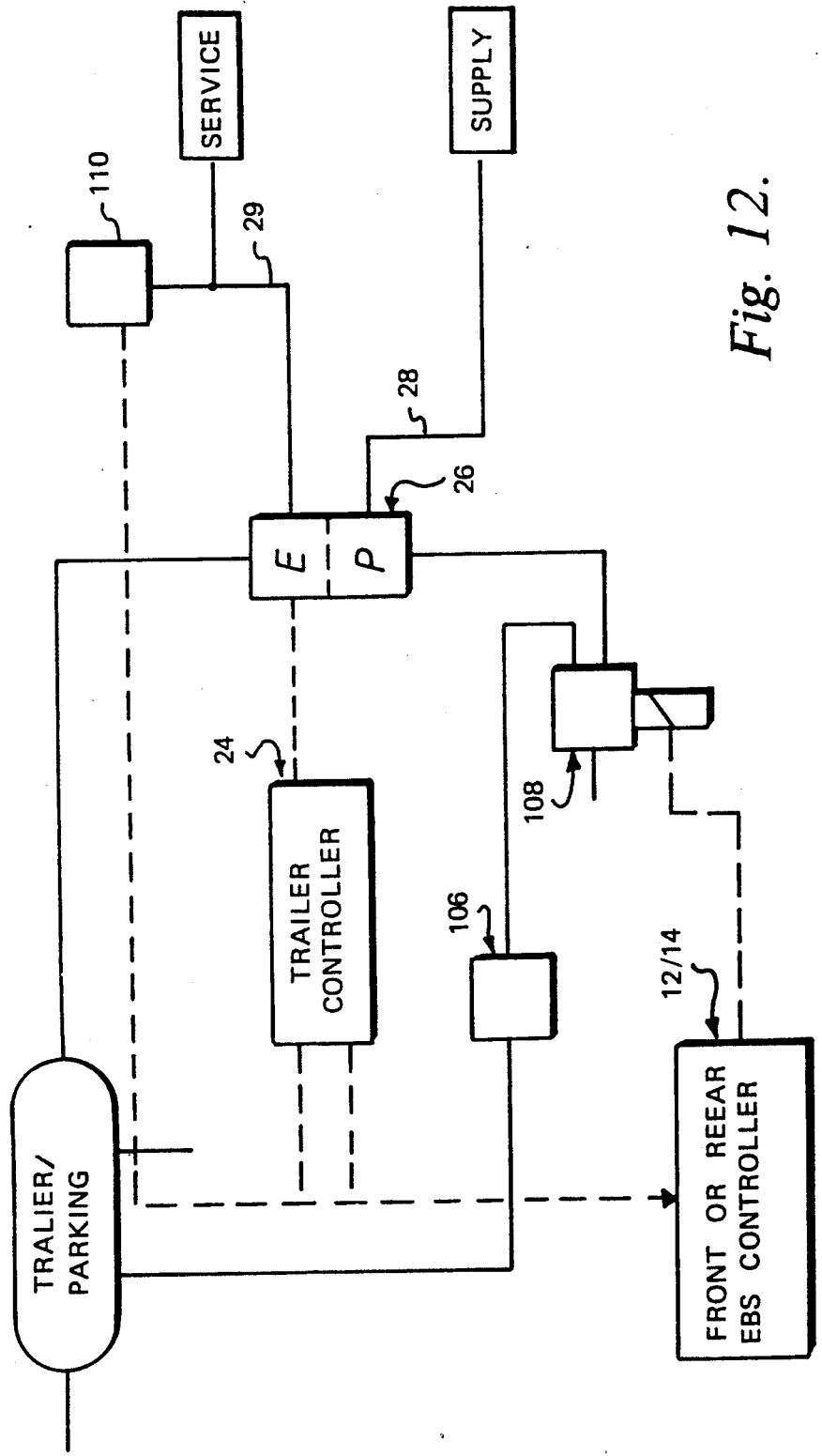
Figure 13:
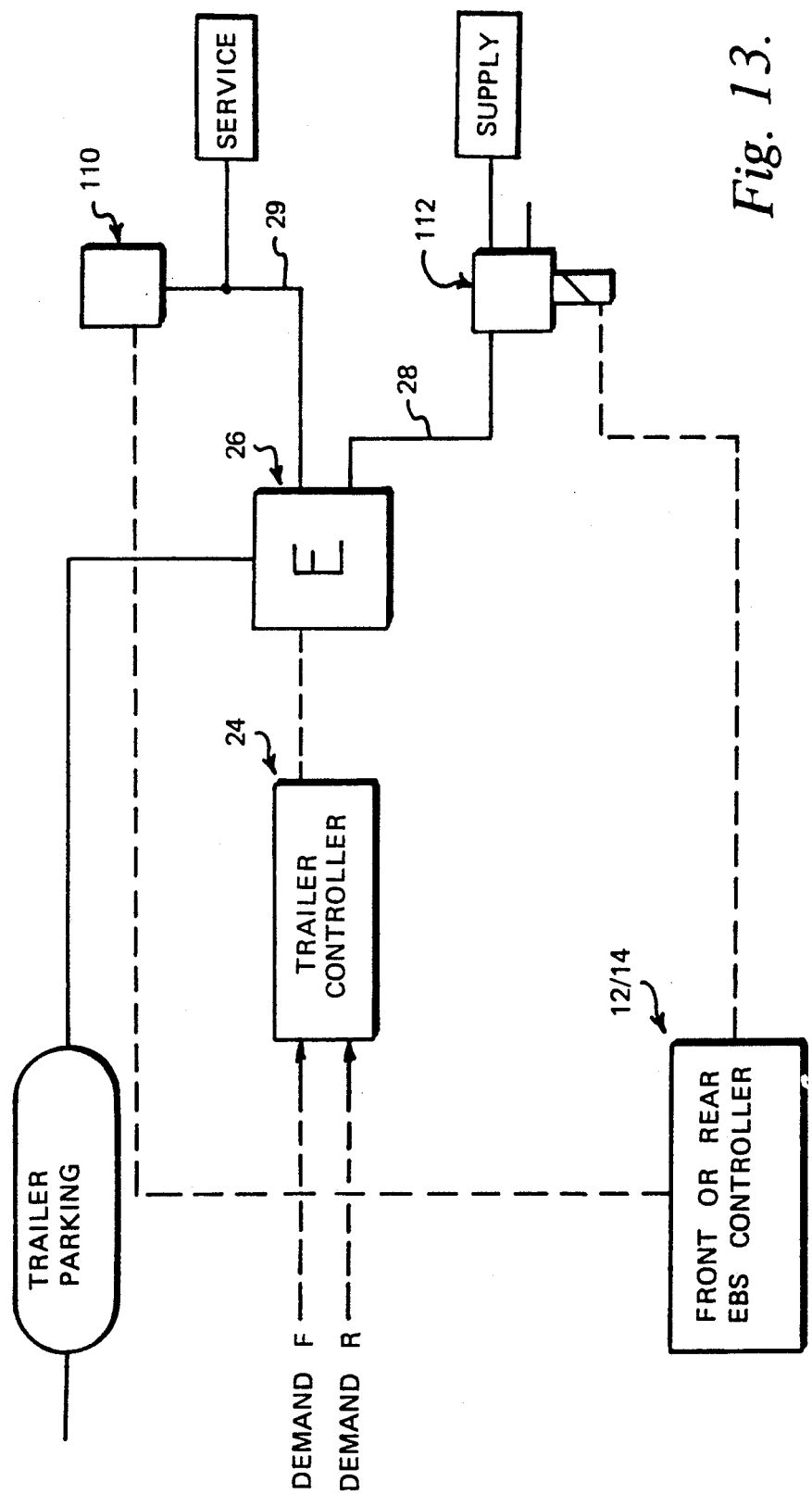
Figure 14:
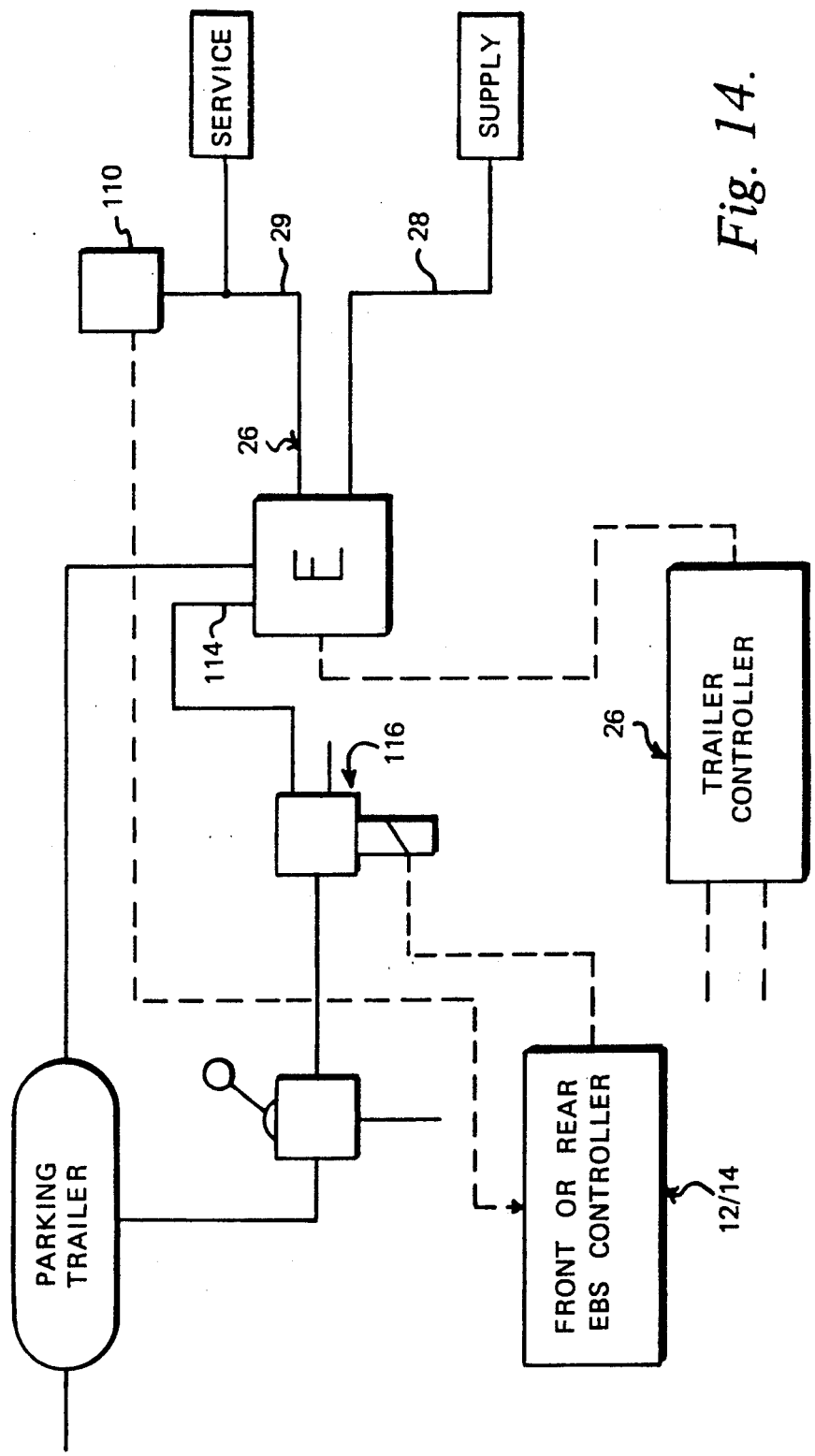

FIG. 8 is a cross-section through a second embodiment of trailer brake valve in accordance with the present invention; and FIGS. 9 to 11 are schematic diagrams of three variations of the braking circuit of FIG. 1, in accordance with the present invention; and FIGS. 12 to 14 are schematic diagrams of portions of three variations of the braking circuit of FIG. 1, in accordance with the present invention.

Referring firstly to FIG. 1, a typical electronic braking system (EBS) circuit comprises a brake pedal 10 which feeds electrical braking demand signals to front and rear brake control units 12, 14 via respective, independent channels. Each of the front and rear brake control units 12, 14 is adapted to control two EBS modulators M, each modulator being adapted to supply braking pressure to an associated brake actuator 16.

Pressurised air is fed to the front and rear modulators M along separate supply lines 18, 20 from a compressor (not shown) and via a multi-circuit protection valve 22. In this way, front and rear braking systems of the vehicle are separate, both pneumatically and electrically. This configuration is known, and appears in, for example, EP 0205277A.

The two braking demand signals from the brake pedal 10 are also fed to a trailer brake valve controller 24 which controls a trailer brake valve 26 in order to modulate the pressure in the service line 29 of the trailer and to supply pressurised air to the supply line 28. Pressurised air is supplied to the trailer brake valve 26 from the compressor via the multi-circuit protection valve 22, and a parking brake pressure can also be supplied to a separate input of the trailer brake valve 26 via a selective parking brake valve 30. The signals received by the trailer control unit 24 are used to control the valve 26, thereby allowing a braking pressure to be supplied to the brakes of a trailer.

The EBS brake pedal 10 provides electrical signals to the trailer controller 24 proportional to the deceleration demanded by the driver. By using suitable software, the controller is able to respond to those demands and set the appropriate pressure at the service coupling head via the valve 26. This means that the system can be arranged to conform with regulations (e.g. Annex 10 of the ECE Regulation 13) for braking performance.

A back up operation for the valve 26 is also possible, as explained hereinafter. The pressure supplied by each pair of the four EBS modulators M is fed via a respective double check valve 32, 34 to a further double check valve 36, and the output of the double check valve 36 is fed into a further input of the trailer brake valve as a back up pneumatic pressure. In this way the highest of the pressures supplied to the four vehicle brakes is fed to the further input, and is used to provide a back up braking pressure to the trailer brake valve. This is significant if ABS operation is occurring, since the pressures applied to each wheel may not be equal.

Figure 2:
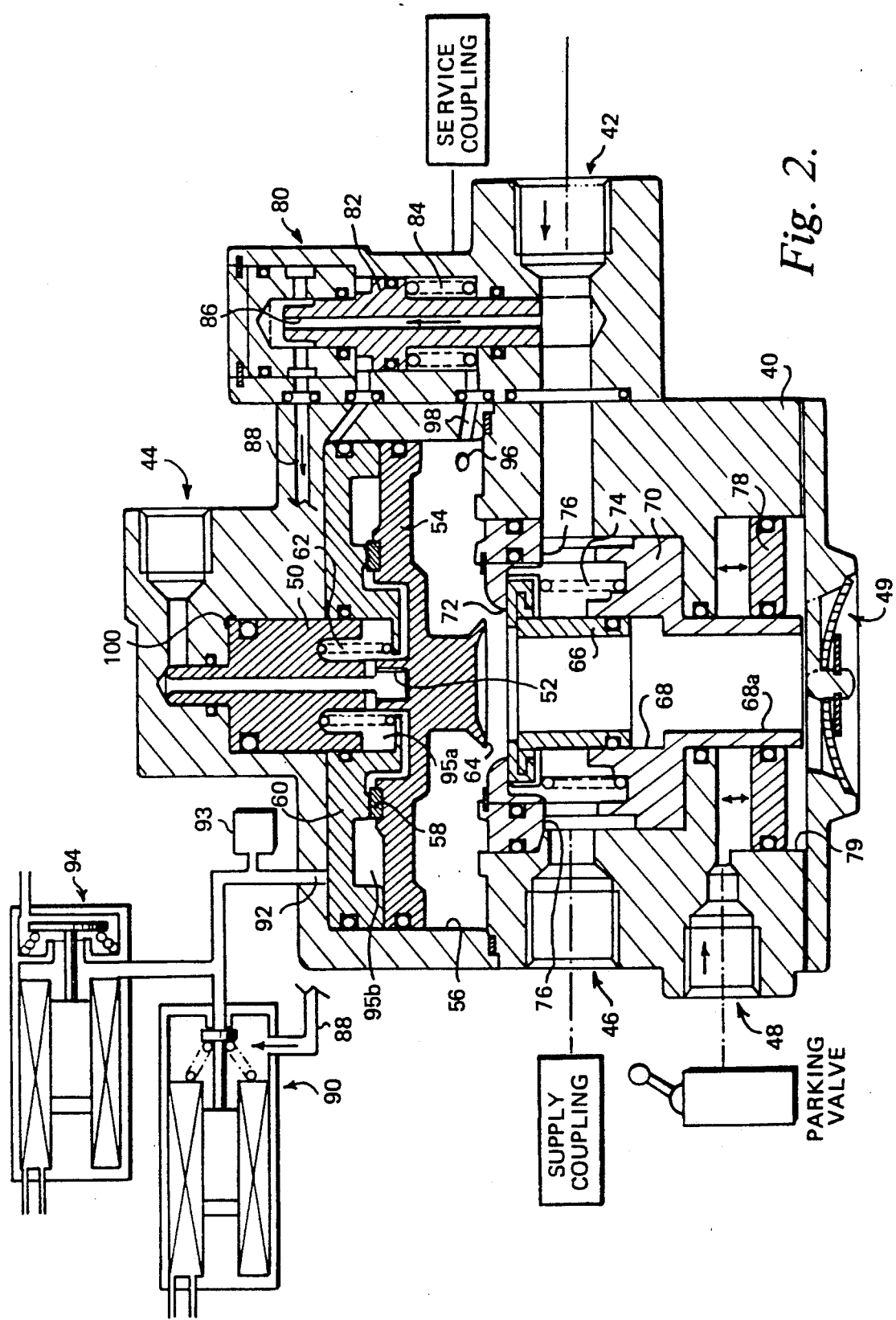
FIG. 2 is a cross-section through embodiment of trailer brake valve in accordance with the present invention, shown in a non-braking mode.

The construction of the trailer brake valve is shown in FIG. 2, and comprises a valve housing 40 comprising a main pneumatic pressure inlet port 42, a back up pneumatic inlet port 44, a trailer supply coupling port 46, a parking valve port 48, a one-way diaphragm outlet valve 49 and a trailer service coupling port 96 in the valve housing supplying braking pressure to the trailer brakes. A stepped relay piston 50 is disposed within the housing, and has a relatively wide cylindrical portion and a narrow nose portion, each portion being slidable in a respective bore. The relay piston is rigidly connected, by means of a threaded connection 52 to a much wider piston 54 which is also slidably disposed in its associated bore 56. The upper surface of the piston 54 is provided with an annular valve seat 58 radially inwardly of its periphery which is adapted to engage sealingly an annular rim of a further piston 60 which is slidably disposed within the bore 56 and on the relay piston 50. The annular rim of the piston 60 is biased into engagement with the valve seat 58 by means of a compression spring 62 extending between the undersurface of the relay piston 50 and the piston 60.

The base of the piston 54 is provided with a downwardly depending annular exhaust seat 64 which is engageable with a tubular inlet valve closure member 66. The inlet valve closure member 66 is slidably disposed in the upper portion 68 of a stepped bore 68, 68a within a stepped piston 70. An enlarged head portion of the inlet valve closure member is biassed into engagement with an annular inlet seat 72 located on the stepped piston 70 by means of a further compression spring 74. The stepped piston is provided with apertures 76 in its sidewalls, and a parking brake piston 78 is slidably received on a reduced diameter portion of the stepped piston 70 and in a corresponding bore 79 in the valve housing.

The valve is also provided with a supply dump valve 80 having an elongate piston 82 which is slidably disposed in a bore and biassed upwardly into its illustrated position by means of a compression spring 84. A central bore 86 in the elongate piston normally supplies the supply pressure, via a connecting bore 88 to one side of a normally closed inlet solenoid valve 90. The outlet of the solenoid valve 90 is connected to a first control chamber 92 defined between one end wall of the cylinder 56 and the piston 60, the control chamber also being connected to a normally open exhaust solenoid valve 94. A pressure transducer 93 senses the pressure in the first chamber 92 and feeds electrical signals to the controller 24. A second control chamber 95 is defined between the pistons 54, 60. The two pistons normally abut each other at valve seat 58, dividing the chamber 95 into inner and outer subchambers (95a, 95b).

A service brake outlet leads from the supply dump valve housing, and communicates with the chamber defined by the piston 54 and the cylinder bore 56 by means of the outlet aperture 96 and a bore 98.

As mentioned previously, the above-mentioned valve is part of the towing truck electronic braking system, and enables the pneumatic trailer service signal to be controlled by the system via the trailer electronic controller. The important feature is that, in order to ensure that a complete loss of trailer service brake pressure does not occur if the trailer controller fails, a pneumatic back up signal, which varies with an applied towing vehicle brake pressure, is maintained at the valve. However, as will be apparent, the valve is constructed such that the back up signal cannot easily override the signal being generated under electronic control, assuming that the latter occurs.

Referring firstly to FIG. 2, the valve is shown in a non-braking mode. Pressure is maintained at the parking brake port 48 which holds the parking brake off. The exhaust solenoid valve 94, under the control of the controller 24, is open, thus ensuring that the control chamber 92 is vented to atmosphere. Conversely, the inlet solenoid valve 90, under the control of the controller 24 is closed, thus preventing air from reaching the control chamber 92. As mentioned previously, the supply dump piston 82 is maintained in its upper illustrated position by means of the spring 84.

Figure 3:
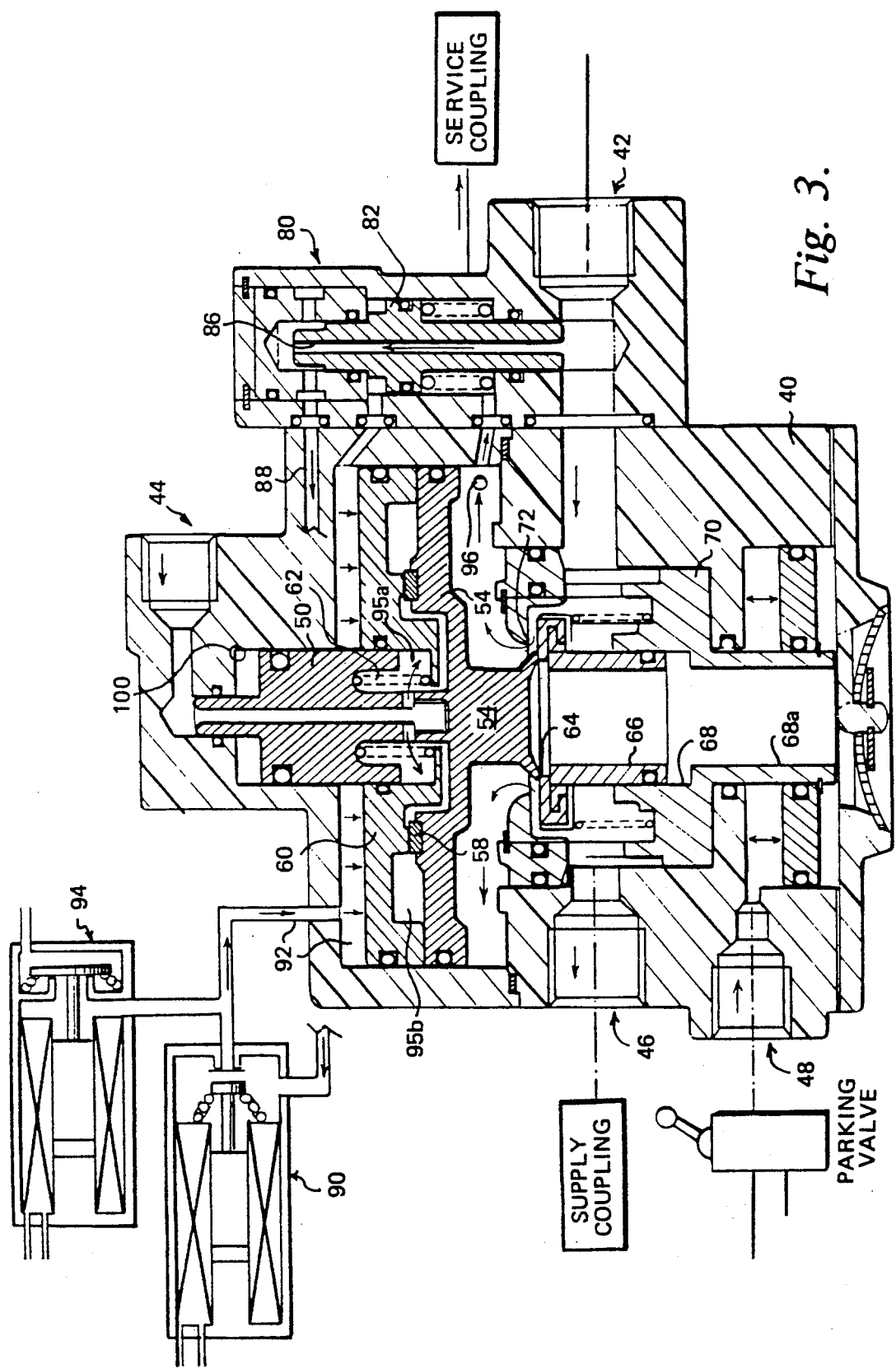
FIG. 3 is a view of the valve of FIG. 2, showing a braking mode.

Referring now to FIG. 3, the valve is shown in a normal braking situation, i.e. under the control of the controller 24. In this situation, the exhaust solenoid valve 94 is closed and the inlet solenoid valve 90 is opened by means of electrical signals supplied by the trailer controller 24, in response to receipt of a braking demand signal from the pedal 10. Air is thus fed to the control chamber 92 via the bore 86 in the piston 82 of the supply dump valve and via the bore 88. This forces the piston 60 downwardly, which also causes the relay piston 50 and the further piston 54 to which it is connected to descend. This downward movement causes the downwardly-depending annular exhaust seat 64 to displace the inlet valve closure member 66 out of engagement with the annular inlet seat 72. This causes air to flow from the supply port 42 via the outlet bore 96 into the service brake circuit, thus generating the trailer brake pressure.

When the downward force on the relay piston 50 is balanced by the upward force caused by the delivery pressure acting on the underside of the piston 54, a "lapped" condition is achieved, which is when the inlet seat 72 and the exhaust seat 64 are both closed by engagement with their respective closure members.

It will also be noted that the back up pressure signal from one of the EBS circuits is fed into the port 44 and into the centre of the relay piston 50 by the central bore located therein. Due to the influence of the spring 62 and the clamping together of the relay piston 60 and the wider piston 54 caused by the control and delivery pressure acting on their respective areas, the back up pressure cannot normally pass beyond the annular valve seat 58, and hence acts only on an area bounded by that valve seat, i.e. within the inner subchamber 95, and also on the diameter of the narrow nose of the relay piston 50. The result of this is that the back up signal would have to rise to a valve several times higher than that of the control chamber pressure before it could separate the pistons 54 and 60. Hence, the back up pressure has no influence on the delivery pressure achieved under normal circumstances.

The pressure in the control chamber 92 is raised and lowered by energising the inlet and exhaust solenoid valves 90, 94 respectively, under the control of the controller 24. As a control and delivery pressure are occurring, and provided that they are within a designated pressure limit, the supply dump piston 82 remains in its upper position, as illustrated. It should also be noted that, in order to prevent a vacuum from forming as the relay piston 50 descends, a drilling 100 is provided at the end of the cylinder in which the relay piston 50 is slidable, the drilling 100 being connected to atmosphere.

Figure 4:
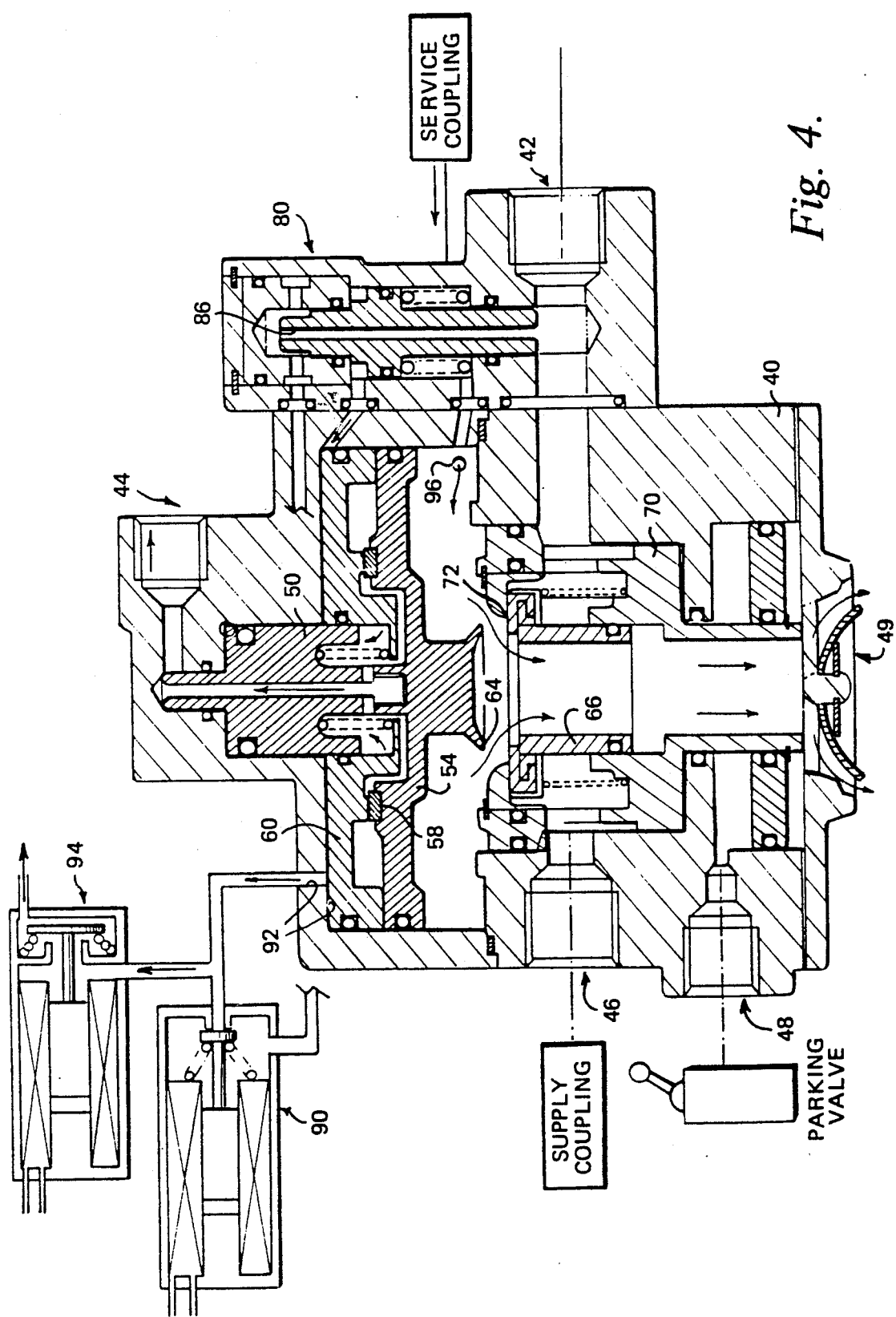
FIG. 4 is a view of the valve of FIG. 2, during a brake release.

FIG. 4 shows the valve in a brake release condition. When the braking demand is removed, the inlet solenoid valve 90 is closed and the exhaust solenoid valve 94 is opened, causing the control chamber 92 to vent to atmosphere, allowing the relay piston 50 to rise, thereby withdrawing the exhaust seat 54 out of engagement with the inlet valve closure member 66. The delivery air is thus discharged from the trailer service line via the port 96 and the open exhaust valve 49, thus releasing the trailer brakes. Since the other EBS circuits will be released at the same time, the back up signal is also released.

Figure 5:
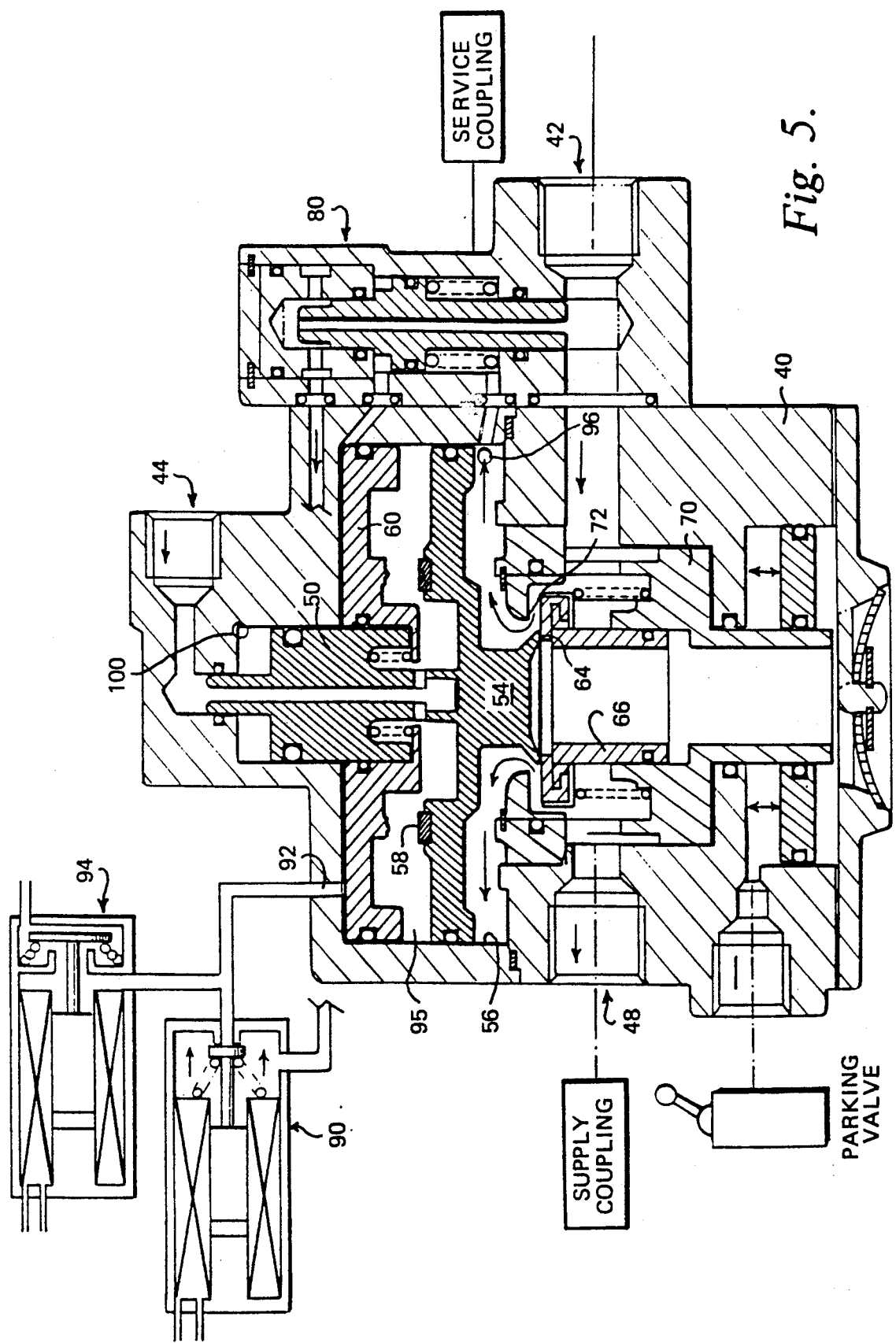
FIG. 5 is a view of the valve of FIG. 2, during a back up mode.

FIG. 5 shows the operation of the back up signal in which the pressure at the service coupling becomes a function of the back up pressure instead of a function of the driver's electrical demand signal. The area over which the back up pressure acts is limited, as described previously, and hence the back up pressure can rise above the control chamber pressure without influencing the delivery pressure. FIG. 5 shows the back up signal actuating the valve, because pressure has not built up in the control chamber, due to failure of the controller to operate the inlet and exhaust solenoids, which would normally be required in order to displace the piston 60 to enable the annular exhaust seat 64 to displace the piston 66 away from the valve seat 72. In this case, it will be seen that the back up pressure is sufficient to displace the relay piston 50 and the further piston 54 downwardly, to open the inlet valve 72 and thus allow pressure to be supplied to the service coupling line. This is possible since there is no pressure in the control chamber 92, and thus it is possible for the back up presure to separate the pistons 54, 60 and therefore for the back up pressure to act on the whole of the surface area of the larger piston 54, and also on the narrow end of the relay piston 50.

The back up pressure will also come into effect in an identical fashion if pressure fails to build in the control chamber due to failure of the inlet solenoid valve 90 or the exhaust solenoid valve 94.

Figure 6:
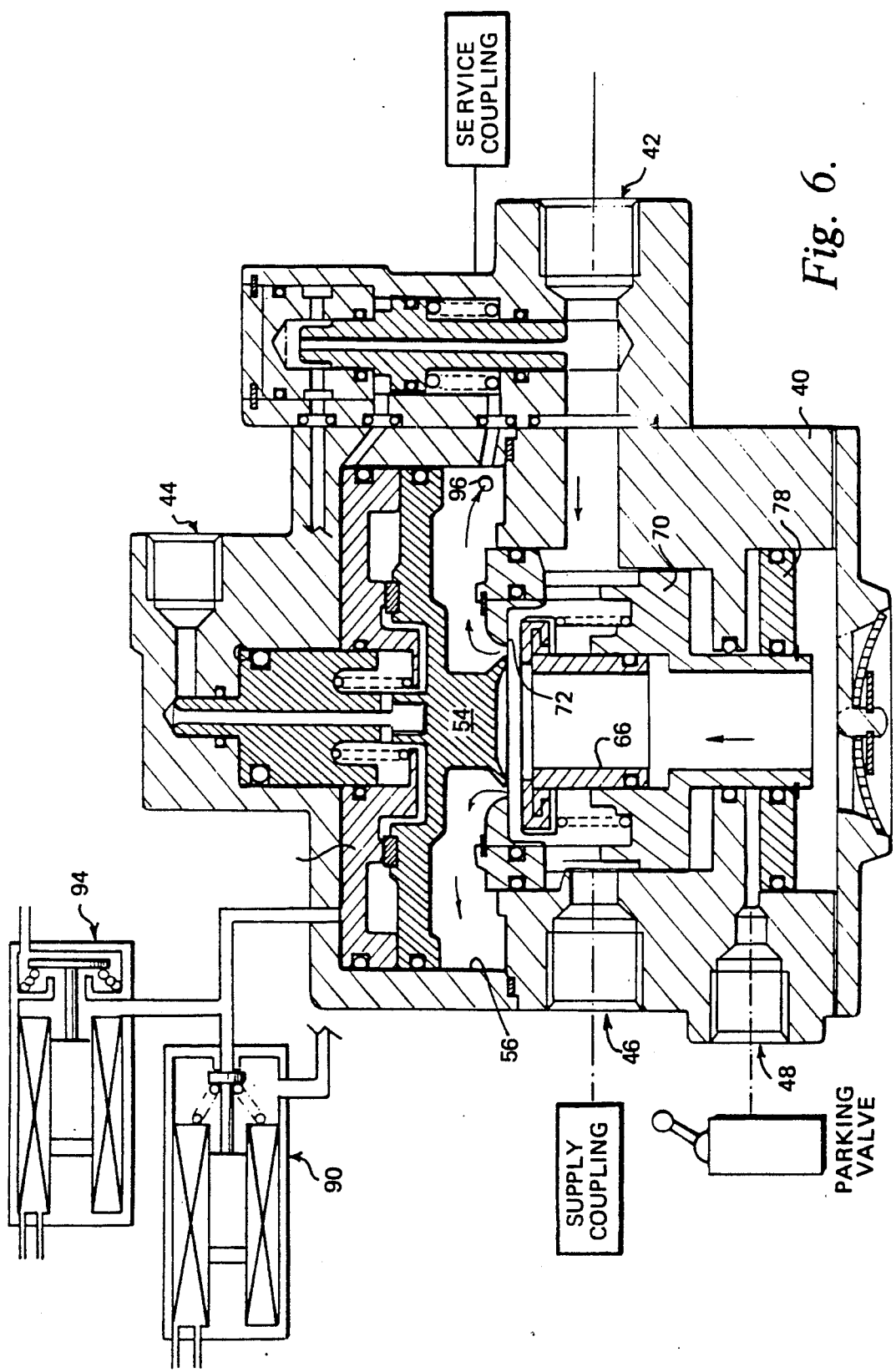
FIG. 6 is a view of the valve of FIG. 2, with a parking brake actuated.

FIG. 6 shows the operation of the parking brake feature of the valve. When the parking valve is operated, air pressure is released from port 48, which causes the stepped piston 70 to rise under the influence of the supply pressure acting over the area between the larger and smaller diameters of the stepped piston. The stepped piston rises until the inlet valve member 66 contacts the inlet valve seat 72. A further reduction in pressure causes the inlet valve 66 to open, permitting air to flow from the supply port 42 to the port 96 in the cylinder wall 56, thus supplying pressurised air to the service brake circuit and operating the trailer brakes.

If the pressure release from the parking brake port 48 is done progressively by the parking valve, a progressive braking effort will occur on the trailer. Re-admitting air pressure into the port 48 causes the brakes to be released, and this can also be done progressively. The progressive action is due to delivery air pressure acting over the largest diameter of the stepped piston and over the diameter of the inlet seat 72, causing a downward force to influence the movement of the stepped piston.

Figure 7:
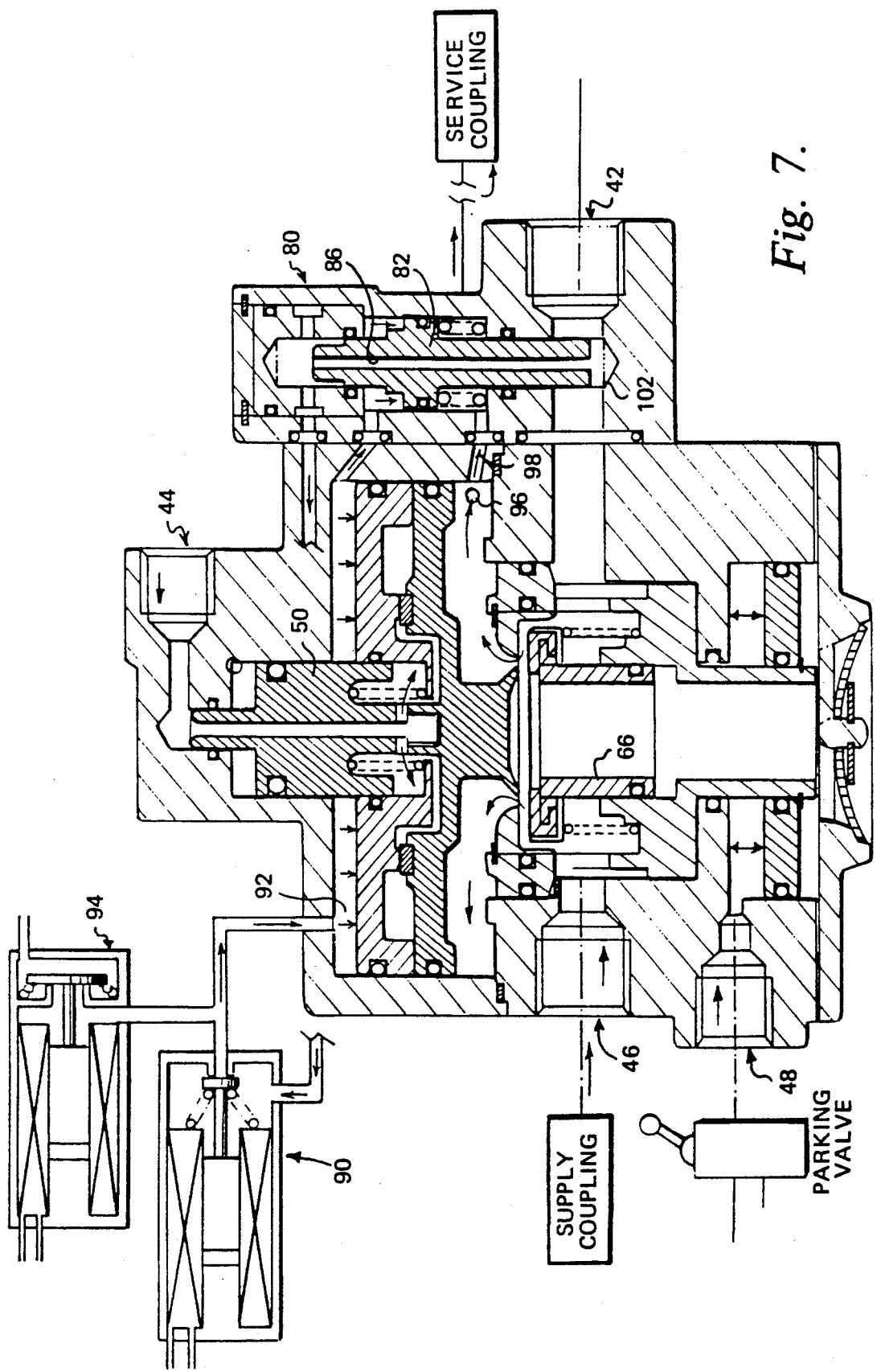
FIG. 7 is a view of the valve of FIG. 2, during a supply dump.

FIG. 7 shows the valve in a supply dump mode. The valve is shown in a brake application mode, but prior to, or during, the application, a fracture has occurred in the service line to the trailer. As a result of this, delivery air is lost through the fracture, which causes the supply dump piston 82 to move downwardly by virtue of the supply pressure fed from the pressure chamber 92 to restrict the supply port 42 by means of a restriction 102 on the end of the supply dump piston 82. As the supply to the valve is restricted, air is drawn from the supply coupling port 46 instead, which results in the supply line to the trailer being rapidly exhausted. This loss of pressure in the trailer supply line causes the trailer emergency relay valve to apply the trailer brakes.

A further embodiment is illustrated in FIG. 8, and is generally similar to the earlier embodiment, and identical components have been marked with identical reference numerals. The only significant difference is that the valve seat 58 and the compression spring 62 acting on the relay piston 50 have been dispensed with, which allows the back up pressure to act over the whole area of piston 54, to which the relay piston 50 is connected. Provided that the back up signal is always at a lower pressure than that in the control chamber which will normally be the case, since the applied brake pressure will only rarely equal the maximum supply pressure, this design would be satisfactory. If the back up signal were to rise above the control chamber pressure, the delivery pressure would be a function of the back up pressure rather than that set by the trailer controller.

In the following embodiments, many components referred to previously are present, and in the accompanying Figures, identical components have been denoted with identical reference numerals.

FIG. 9 shows a braking circuit very similar to that of FIG. 1, but it is slightly simplified with respect thereto. It will be noted that the back up pressure is taken from the pressure fed to the rear towing vehicle brakes only, and only one double check valve 34 is required in order to select the higher of the pressure applied to the two rear brakes. It will, however, be appreciated that the back up pressure could equally well be supplied from the pressure applied to the front brakes only of the towing vehicle.

A further variant is shown in FIG. 10, in which, instead of supplying a separate back up pressure from the pressure applied to the brakes of the tractor, a second channel 100 branches from the normal braking pressure supplied to the trailer valve 26, and is fed into the valve via a modulator 102 controlled by a second electrical channel of the trailer controller 24 into the trailer valve 26. This allows a back up pressure to be supplied to the trailer which is independent of the pressure in the front and/or rear brakes of the tractor. A further variant of this is shown in FIG. 11, where the trailer controller 24 is dispensed with, and instead the front and rear controllers 12', 14' are each provided with a separate trailer braking channel 24', 24" respectively. The trailer channel 24" of the rear controller 14' is responsible for supplying a normal braking pressure to the electrical trailer valve 26, whereas the trailer channel 24' of the front controller 12' controls the modulator 102 located in the additional pressure channel 100 leading from the normal pressure input, and thereby providing the back up pressure required.

FIG. 12 shows a portion of a braking circuit in accordance with the present invention, in which the back up pressure to the electrical trailer valve 26 is taken from the trailer/parking pressure reservoir. In the particular embodiment shown, the pressure is fed via a pressure regulator 106 and a solenoid-operated valve 108 which is under the control of either the front or rear trailer controller 12, 14, and which thus modulates the pressure in accordance with braking demand. Signals from a pressure sensor 110 in the trailer service line 29 are fed into the said front or rear controller 12, 14, and if it is determined that the pressure in the service line 29 is lower by a predetermined amount than that which should be present according to the value calculated by the trailer controller 24, the controller 12 or 14 actuates the solenoid valve 108, thus connecting the trailer/parking pressure to the electrical trailer valve 26 as a back up pressure. Either the full reservoir pressure can be applied, or preferably a preset proportion thereof by means of the pressure regulator 106.

Alternatively, and as shown in FIG. 13, the back up may be in the form of the trailer emergency brake pressure. Again, upon determination by the front or rear controller 12, 14 that the pressure sensed by the sensor 110 in the service line 29 is lower by a predetermined amount than that which should be present, the controller 12, 14 actuates a solenoid valve 112 located in the supply line 28. Operation of the valve releases the trailer supply line pressure, bringing the trailer emergency brakes into operation. A variation of this idea is shown in FIG. 14, in which the back up pressure is in the form of the parking brake pressure, the parking brake pressure being brought into operation by actuation of a solenoid valve 116 which is under the control of the front or rear controller 12, 14, and which receives signals from a pressure sensor 110 in the service line 29. In this way, if the pressure supplied is less by a predetermined amount than that which should be supplied, air is released from the trailer valve parking brake port, and thus the trailer brakes are actuated as a safety measure.

It will be noted that the operation of the electrical trailer valve 26 in this configuration is shown in FIG. 6, and is described in the corresponding portion of the description.

In a further embodiment, the electrically controlled trailer valve 26 includes a second control channel from the trailer controller 24 or separate control channels can be taken separately from the front and rear controls 12, 14. Under normal conditions, each channel would output the same control signals, but if failure of one occurs, the other will maintain control.

The invention is not restricted to the details of the foregoing embodiments.

We claim:

1. A trailer braking system for a towing vehicle, comprising:
   transducer means for generating electrical braking demand signals in response to a demand;
   trailer braking control means adapted to receive said electrical braking demand signals and to produce an electrical control signal which varies with the braking demand;
   means for producing a control pressure in response to the control signal in order to regulate a trailer braking valve whose opening is regulated by said control pressure and which thereby modulates a pressurized air supply to the valve to generate a trailer braking pressure;
   means for supplying a back-up control pressure simultaneously with said control pressure to regulate the opening of said valve; and
   means for comparing said control pressure and said back-up control pressure and for enabling actuation of said trailer braking valve by said back-up control pressure when the difference in values between the control pressure and the back-up control pressure indicates insufficient braking by the control pressure.

2. A trailer braking system as claimed in claim 1, wherein the backup control pressure is supplied continuously during braking from a brake circuit of the towing vehicle.

3. A trailer braking system as claimed in claim 2 wherein said means for supplying said back-up pressure comprise valve means for selecting the highest of a plurality of braking pressures applied to respective brakes on the towing vehicle.

4. A trailer braking system as claimed in claim 1, wherein said trailer braking control means is also adapted to regulate the opening of a further valve forming part of said means for supplying a back-up pressure in order to modulate said pressurized air supply fed to the further valve and thereby generate an output which forms said back-up control pressure fed to the trailer braking valve.

5. A trailer braking system as claimed in claim 1, comprising a pressure sensor for sensing the braking pressure in a trailer brake, comparator means for determining whether the trailer braking pressure is acceptable, and valve means controlled by said comparator means for connecting said backup control pressure to said trailer braking valve.

6. A trailer braking system as claimed in claim 5, further comprising a pressure regulator connected between said valve means and said pressurised air supply, wherein the backup control pressure is a proportion of said pressurised air pressure.

7. A trailer braking system as claimed in claim 5, wherein said pressurised air supply comprises a trailer air pressure reservoir.

8. A trailer braking system as claimed in claim 5, wherein said pressurised air supply comprises pressure for retaining towing vehicle parking brakes released.

9. A trailer braking system as claimed in claim 1, wherein said trailer braking control means forms part of front and rear towing vehicle braking control means which are also adapted to receive electrical braking demand signals from the pedal and which control the operation of front and rear brakes of the towing vehicle.

10. A trailer braking system as claimed in claim 9, wherein the front and rear towing vehicle braking control means are separate, and the trailer braking control means adapted to produce the control signal forms part of one of the front and rear vehicle braking control means.

11. A trailer braking system as claimed in claim 1, wherein the first and back-up control pressures are supplied to respective first and second non-communicating chambers within the trailer braking valve.

12. A trailer braking system as claimed in claim 11, wherein one end of the first chamber is defined by a first piston and the second chamber is defined between the first piston and a second piston against which the first piston is displaceable into engagement.

13. A trailer braking system as claimed in claim 1, wherein the trailer braking valve comprises a valve housing, a valve inlet for the pressurized air supply, a valve outlet for a supply of trailer braking pressure produced by the trailer braking valve, a valve seat disposed between the inlet and the outlet, a valve closure member, a first piston slidably disposed within said valve housing and being displaceable by application of the control pressure to a first pressure chamber, one end of which is defined by said first piston, a second piston slidably disposed within said valve housing between the first piston and the valve seat, a second pressure chamber defined between said first and second pistons and to which the back-up control pressure is applied, the second piston being engageable with the valve closure member whereby displacement of the second piston causes the valve closure member to be displaced from its valve seat.

14. A trailer braking system as claimed in claim 13, comprising biassing means for urging the first and second pistons into engagement with each other.

15. A trailer braking system as claimed in claim 14, wherein the first and second pistons engage sealingly with each other over an annular surface dividing said back-up pressure chamber into two mutually isolated inner and outer volumes, the second control pressure being applied to only one of the volumes.

16. A trailer braking system as claimed in claim 15, wherein said back-up control pressure is applied to the inner volume of the second pressure chamber.

17. A trailer braking system as claimed in claim 1, further comprising a pressure inlet valve to which a source of air for forming the control pressure is supplied and a pressure exhaust valve which is connectible to atmosphere, the opening of the inlet and exhaust valves being regulated by the trailer braking control means in order to supply said control pressure.

* * * * *